United States Patent Office 3,424,728
Patented Jan. 28, 1969

3,424,728
AROMATIC POLYQUINAZOLINEDIONES AND A PROCESS THEREFOR
Ryoji Nakanishi, Naoya Yoda, and Masaru Kurihara, Kamakura-shi, Japan, assignors to Toyo Rayon Kabushiki Kaisha, Tokyo, Japan, a corporation of Japan
No Drawing. Filed June 24, 1964, Ser. No. 377,478
Claims priority, application Japan, Feb. 10, 1964, 39/6,637
U.S. Cl. 260—77.5         2 Claims
Int. Cl. *C08g 30/02*

This invention relates to novel condensation polymers, and more particular to thermally stable aromatic polyquinazolinediones of high molecular weight and a process for their production.

As the thermally stable polymers, polybenzoxazoles with aliphatic linkages in the polymer chain have previously been reported. Generally speaking, these polymers have such characteristic properties, besides thermal stability, as light resistance, low water adsorption, high crystallinity and so on. However, most of these polymers reported so far have a melting point of below 300° C. and there is almost no commercial value so far as thermal stability is concerned.

This invention provides high molecular weight polymers of excellent thermal stability which has not been satisfied by the previously known polymers such as polybenzoxazoles.

Accordingly, an object of this invention is to produce new and valuable polymeric materials. Another object is to provide novel condensation polymers of excellent thermal stability, which are also highly resistant to most of organic chemical reagents and which therefore can find wide applications.

Other objects and advantages of this invention will become apparent from the following description.

The aromatic polyquinazolinedione of this invention consists of at least one kind of recurring unit represented by the general formula:

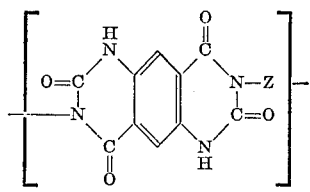

and

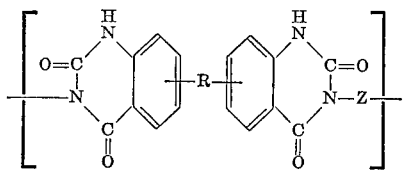

wherein Z is a divalent radical selected from the group consisting of:

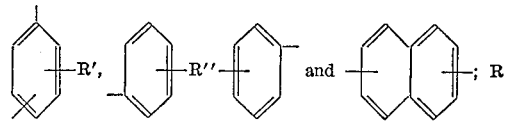

is selected from the group consisting of a direct carbon-to-carbon bond between the two aromatic rings, an alkylene radical having 1 to 3 carbon atoms, oxygen, —CONH—, and

—R′ is a monovalent radical selected from the group consisting of hydrogen and an alkyl radical having up to 2 carbon atoms, and R″ is selected from the group consisting of a direct carbon-to-carbon bond between the two aromatic radicals and an alkylene radical having one to three carbon atoms.

Particularly preferable among the said recurring units is the one represented by the general formula:

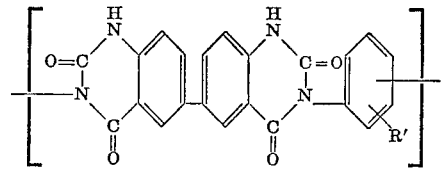

The polyquinazolinedione illustrated in this invention consists essentially of the said recurring units, but it may safely contain other radicals, preferably aromatic radicals, in the main chain or its end radicals.

The degree of polymerization of polyquinazolinedione of this invention corresponds to an inherent viscosity of 0.2 to 2.0 measured in a concentrated sulphuric acid at 0.5% concentration at 25° C.

The term "inherent viscosity" or "$\eta_{inh}$" used herein is defined by the following equation:

$$\eta_{inh} = \frac{\ln \eta_{rel}}{C}$$

wherein C is a concentration of polymer in terms of grams per 100 cc. of the solvent and usually it equals 0.50 (i.e., 0.5 g. of polymer per 100 cc. of a concentrated sulphuric acid), ln $\eta_{rel}$ is a natural logarithm of the relative viscosity of a diluted polymer solution (less than 1%).

The aromatic polyquinazolenedione of this invention is produced by heating a mixture of substantially equimolar quantities of (a) an aromatic diaminodicarboxylic acid (including its esters) of the class consisting of

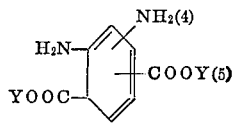

and

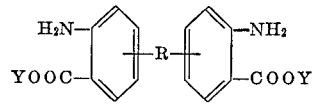

where —Y is a monovalent radical selected from the group consisting of hydrogen, alkyl, aryl and arylalkyl; —R— represents a divalent radical selected from the group consisting of a direct carbon-to-carbon bond between the two aromatic rings, a divalent alkylene radical having 1 to 3 carbon atoms, oxygen, —CONH—, —S— and

and radicals (4) and (5) are both bonded to adjacent carbon atoms on the benzene ring with (b) an aromatic diisocyanate of the class consisting of

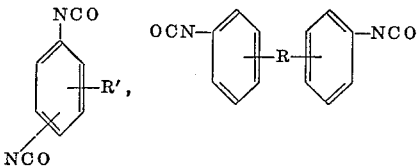

and

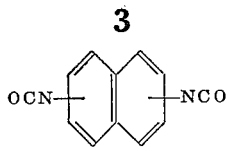

wherein —R— represents a divalent radical selected from the group consisting of a direct carbon-to-carbon bond between the two aromatic rings, a divalent alkylene radical having 1 to 3 carbon atoms, oxygen, —CONH—,

and —S—; and —R' is a monovalent radical selected from the group consisting of hydrogen and an alkyl radical having up to 2 carbon atoms at a temperature of 100 to 400° C., preferably 150 to 350° C.

Hereinafter, the compound (a) is referred to as an aromatic diaminodicarboxylic acid and the compound (b), as an aromatic diisocyanate.

The aromatic diamino dicarboxylic acid employed in this invention is characterized by the molecular structure in which amino radicals and carboxyl radicals are adjacent to each other at the ortho-position in aromatic rings.

The said aromatic diaminodicarboxylic acid preferably consists of 3,3' - dicarboxy - benzidine, 2,5 - diaminoterephthalic acid, methylene - bis (4,4'-diamino - 3,3' - dicarboxyl phenyl), 3,3'-dicarboethoxybenzidine, 4,4'-diamino-3,3'-dicarboxy diphenyl ether, 2,6-dicarboxy-3,7-diamino naphthalene, bis(3,3'-dicarboxy - 4,4' - diaminophenyl) amide, and bis(3,3'-dicarboxy-4,4'-diaminophenyl) sulfone. The carboxyl radical of this compound may form an ester bond. Actually, compounds esterified with methanol, ethanol, phenol, benzylalcohol, etc. often give more pleasing polymers.

Typical and preferable examples of the said aromatic diisocyanate are p-phenylene diisocyanate, 1,5-naphthalene diisocyanate, methylene - bis(4 - phenyl isocyanate), 2,4-tolyl diisocyanate, 2,6-tolyl diisocyanate, bisphenyl (3,3' - dimethyl - 4,4' - diisocyanate), bisphenyl(3,3' - dimethoxy-4,4'-diisocyanate) and biphenylene - 4,4' - diisocyanate.

The aromatic polyquinazolinedione of this invention can be obtained by polycondensing both of the said components while heating them to a temperature of 100 to 400° C. The general conditions for the practice of this reaction can be determined in accordance with the ordinary polycondensation reaction. The components are used in substantially an equimolar quantity (including those cases where the quantity of one component is in excess of that of the other by several percent); more than two kinds of both components may be used conjointly. As the polymerization means, bulk polymerization (melt polymerization) and solution polymerization in which a reactant is heated in the presence or absence of a solvent give good results. The polymerization is carried out at a temperature of 100 to 400° C., but at a preliminary stage of polymerization it is preferably effected at a relatively low temperature of 100 to 220° C. The reason is that polymers obtained under a temperature condition of less than 220° are generally fusible and soluble in an organic solvent (because a urea fragment remains in the main polymer chain due to incomplete cyclization or cross-linking), whereas polymers obtained under a temperature condition of above 220° C. are infusible and insoluble in an organic solvent. The bulk polymerization may be carried out by heating both components to a temperature above their melting point in a homogeneous system, and it may also be effected in a liquid-solid phase prepared by dissolving one component to form a liquid and adding the other solid monomer thereto. For the reasons mentioned so far, it is preferable in such bulk polymerization to accelerate the polymerization in a preliminary stage at a relatively low temperature in order to obtain polymers of high molecular weight. Thereafter the temperature is gradually raised to form a final infusible polymer of high molecular weight. Or, it is possible to shape the fusible prepolymer and heat the shaped article to a temperature of above 220° C. to finally form an infusible polymer of high molecular weight.

As preferable solution polymerization, there can be employed a method in which an ordinary inert organic solvent is used and one in which an acidic liquid dehydrating agent such as a polyphosphoric acid is used.

It is easy to obtain a soluble prepolymer by such solution polymerization. The preploymer is easily shaped at this stage into fibres, films, etc., and made into an infusible polymer of high molecular weight by high temperature treatment. This is an advantage with such solution polymerization.

Examples of an ordinary inert solvent are dimethylformamide, dimethylsulfoxide, diethyl sulfone, N-methyl pyrrolidone, dimethyl acetamide hexamethyl phosphoramide, trifluoroacetic acid, formic acid, pyridine, phenol, meta-cresol, and cresylic acid. The amount to be used is not particularly limited, but it is preferably less than 20× by volume based on the monomer.

As an acidic liquid dehydrating agent, a polyphosphoric acid and a fuming sulphuric acid are particularly preferable. The use of an acidic liquid dehydrating agent is especially effective for the prevention of cross-linkage. The amount of such acidic liquid dehydrating agent to be used is preferably in the range where the mixture is 5 to 20% by volume of the acidic liquid dehydrating agent. At the time of polymerization, there may be added as a catalyst an amine such as triethylamine, pyridine and aniline and a metal salt such as cupric chloride and naphthalene cobalt.

The atmosphere of a polymerization system in these polymerization methods is preferably an inert gas such as nitrogen, but air may also be used. The polymerization pressure is not particularly limited.

We have already mentioned that the polymer obtained by effecting polymerization at a relatively low temperature is made into an infusible polymer which is insoluble in ordinary organic solvents of high molecular weight by high temperature treatment. Such secondary polymerization can be achieved in the manner mentioned below.

Powder, granules or a shaped article such as fibre and film of the polymer which is obtained by a primary polymerization is heated to a temperature of 220 to 440° C., preferably 250 to 350° C. In this case, the system is preferably so adjusted that the pressure is reduced and a stream of an inert gas such as nitrogen is introduced. The pressure is reduced to below 20 mm. Hg, preferably below 3 mm. Hg. The thus obtained aromatic polyquinazolinedione is infusible and stable even at a temperature in the range of 500 to 900° C. and is insoluble in ordinary organic solvents, alkalis and acids.

The effect of such secondary polymerization is assumed to be derived from the reaction of active terminal radicals with each other, the cyclization of the uncyclized part of the main polymer chain (the main chain being formed by a urea bond) and a cross-linking formation.

The aromatic polyquinazolinedione of this invention gives desirable effects when its viscosity is in the range of 0.2 to 2.0; it gives preferred effects when this inherent viscosity is in the range of 0.5 to 1.5.

The following examples are given in illustration of this invention and are not intended as limitations on the scope of this invention. All where parts mentioned are parts by weight.

Example 1

23.7 parts of biphenylene diisocyanate were dissolved in 100 ml. of purified dimethyl formamide. The solution was added into 30 parts of bis(4,4'-diamino-3,3'-dicarboxyphenyl) amide dissolved into 100 ml. of purified dimethylformamide. The mixture was reacted at room temperature for 5 hours under nitrogen atmosphere, gradually heated to 150° C., and refluxed at this temperature for 5 hours. The polymer solution of dimethyl formamide became increasingly viscous. After the solvent was removed by rotary evaporator under vacuum, the resulting polymer was heated at 250–260° C./1 mm. Hg. for 2 hours. The polymer was obtained as dark yellow powder. The inherent viscosity was 0.95 (0.5%, conc. $H_2SO_4$, 25° C.). The molecular structure of the polymer was determined by infrared spectra and an elemental analysis.

The polymer did not decompose even at 550° C. under nitrogen atmosphere and the weight loss measured at 550° C. and at 900° C. was found to be 5% and 10%, respectively.

Example 2

28 parts of bis(4,4'-isocyanylphenyl) amide and 800 parts of polyphosphoric acid were stirred in a polymerization flask under nitrogen atmosphere. The polymerization system was heated at 80° C. and 32.0 parts of bis-(4,4'-diamino-3,3'-dicarboxyphenyl) sulfone were added thereto slowly. After heating at 150–160° C. for 5 hours, the resulting viscous solution was poured into 500 ml. of distilled water. The polymer was freed from polyphosphoric acid upon filtration, washed with 10% aqueous sodium carbonate solution. Then, it was left to stand overnight in this solution, washed with water and methanol and dried in vacuum. The polymer was obtained quantitatively as a light brown crystal $\eta_{inh}$ is 1.20 (conc. $H_2SO_4$, 0.5%, 25° C.).

Tough and flexible film of the polymer can be prepared by shaping its 30% solution in dimethyl sulfoxide or N-methyl pyrrolidone. When the said film was heated at 250–300° C./0.1 mm. Hg for 3 hours, a highly heat resistant film was obtained, which is insoluble in most organic solvents.

Example 3

27.2 parts of 3,3'-dicarboxybenzidine prepared by nitration of toluene followed by the benzidine rearrangement were finely pulverized. 14.0 parts of tetramethylene diisocyanate were placed in a 500 ml. round-bottomed flask and heated at 180–185° C. with flushed nitrogen-stream, followed by the addition of 3,3'-dicarboxybenzidine into the flask with mechanical stirring.

After the addition period of 40 minutes, the polymerization temperature was raised up to 250–280° C. under vacuum at 1–2 mm. Hg in nitrogen atmosphere.

The reactant afforded a high molecular weight polymer of crystalline polyquinazolinedione which does not melt nor decompose around 550° C.

It is soluble in conc. $H_2SO_4$, formic acid and such organic solvent as dimethyl sulfoxide, dimethyl acetamide, dimethylformamide, N-methyl-2-pyrrolidone and hexamethyl-phosphoramide.

Tough and flexible film can be prepared by shaping a solution of the polymer in dimethylsulfoxide, N-methyl-2-pyrrolidone, etc.

The infrared spectra shows carbonyl absorption bands of quirazolinedione ring at 5.95$\mu$ (strong) and 6.10$\mu$ (strong); the absorption bands of amino radical, carboxylic acid radical and isocyanate radical are all missing. The polymer is stable at 550° C. and it slightly decomposes about 800–900° C. $\eta_{inh}$ is 1.15 (conc. $H_2SO_4$, 0.5%, 25° C.).

Example 4

27.2 parts of 3,3-dicarboxybenzidine were finely pulverized and added into 17.4 parts of 2.4-tolyl diisocyanate in a 500 ml. round-bottomed flask with mechanical stirring under nitrogen atmosphere at 180–185° C. After 40 minutes it was heated at 250–280° C. under nitrogen atmosphere in vacuum. The thermally stable polymer was obtained. The polyquinazolinedione structure was determined by infrared spectra, and an elemental analysis.

The polymer does not melt even at 500° C., but begins slightly decompose at 600–800° C.

Tough and flexible film can be prepared by shaping a solution of the polymer in such organic solvent as dimethyl sulfoxide and N-methyl pyrrolidone. $\eta_{inh}$ is 1.05 (conc. $H_2SO_4$, 0.5%, 25° C.).

Example 5

19.8 parts of 2.5diamino terephthalic acid were pulverized and added into 25.0 parts of diphenylmethane-4,4'-diisocyanate at 180° C. under nitrogen atmosphere with mechanical stirring. After 40 minutes, the resulting polymer was heated at 270–280° C./1 mm. Hg for 2 hours under nitrogen atmosphere.

The crystalline polyquinazolinedione having a melting point of above 550° C. was obtained and the structure was determined by infrared spectra and an elemental analysis. $\eta_{inh}$ is 0.95 (conc. $H_2SO_4$, 0.5%, 25° C.).

Example 6

28.8 parts of diphenylmethane-4,4'-diamino-3,3'-dicarboxylic acid were finely pulverized and added into 25.0 parts of naphthalene-2,6-diisocyanate at 170–180° C. under nitrogen atmosphere. After 40 minutes' addition, the resulting polymer was finely pulverized and heated at 260–300° C./1 mm. Hg under nitrogen atmosphere for 2 hours.

The polymer thus obtained has a melting point of above 550° C. and is stable at a higher temperature in the range of 600–800° C. The structure of polyquinazolinedione was determined by infrared spectra and an elemental analysis. $\eta_{inh}$ is 1.01 (conc. $H_2SO_4$, 0.5%, 25° C.).

Example 7

264 parts of biphenyl (3,3'-methyl-4,4'-diisocyanate) were dissolved in 200 parts of dimethylformamide and the solution was stirred at 160° C. for 2 hours. 348 parts of (4,4'-diamino-3,3'-dicarboethoxy) biphenyl were added into the solution in the period of 40 minutes, and the resulting polymer was filtered. The separated polymer was heated at 260–280° C./1 mm. Hg in nitrogen stream for 2 hours.

The polymer thus obtained is infusible around 450–600° C., and has excellent thermal stability. The structure of polyquinazolinedione was confirmed by infrared spectra and an elemental analysis. $\eta_{inh}$ is 0.96 ($H_2SO_4$, 0.5%, 25° C.).

Example 8

10.0 parts of 3,3'-dicarboxybenzidine were finely pulverized and placed in a 500 ml. round-bottomed flask. Then, 500 parts of polyphosphoric acid were added thereto. 10.0 parts of p-phenylene diisocyanate were added into the flask and the flask was heated slowly up to 120–130° C. for 15 hours under nitrogen atmosphere. The resulting polymer is stable at 550° C. and it exhibits an excellent thermal stability. It is soluble in dimethyl-acetamide, dimethylsulfoxide, and N-methyl pyrrolidone. $\eta_{inh}$ is 1.15 (0.5%, $H_2SO_4$, 25° C.). It can be cast into tough, transparent and flexible film.

Example 9

13 parts of 3,3'-dicarboxybenzidine and 25 parts of methylene bis(4-phenylisocyanate) were dissolved in 500 parts of polyphosphoric acid, and heated at 165° C. with stirring under nitrogen stream for 17½ hours. The resulting polymer is stable at 550° C. and shows excellent thermal stability. $\eta_{inh}$ is 0.86 (25° C., $H_2SO_4$, 0.5%).

Example 10

13.5 parts of 3,3'-dicarboxybenzidine were placed in a 500 ml. polymerization flask and air was replaced by dry nitrogen. 270 parts of polyphosphoric acid were added and heated at 110° C. Upon heating, a small amount of methylene bis(4-phenylisocyanate) was added and the addition was completed in 30 minutes.

The polymer thus obtained was further heated at 220–230° C./1 mm. Hg under nitrogen for 5 hours. The polyquinazolinedione thus obtained is stable at 550° C. and shows excellent thermal stability at 600–800° C. $\eta_{inh}$ is 0.84 (0.5% $H_2SO_4$, 25° C.).

Example 11

13.0 parts of 3,3′-dicarboxybenzidine and 210 parts of 21.0 parts of napthalene-1,5-diisocyanate and 500 parts of polyphosphoric acid were placed in a 1000 ml. polymerization flask and heated at 145° C. for 16¼ hours under nitrogen atmosphere with stirring. The resulting polymer shows excellent thermal stability at 550°–800° C.

$\eta_{inh}$ is 0.89 (0.5% conc. $H_2SO_4$, 25° C.).

Example 12

13 parts of naphthalene-1,5-diisocyanate were dissolved in 200 parts of polyphosphoric acid. Into this solution were added 9 parts of 3,3′-dicarboxy-benzidine dissolved in 200 parts of polyphosphoric acid. 20 parts of triethylamine were added thereto and heated slowly up to 160° C. for 5 hours (rate of raising temperature 20° C./1 mm.). The resulting polymer shows excellent thermal stability even around 550°–600° C.

$\eta_{inh}$ is 0.95 ($H_2SO_4$, 0.5% conc. 25° C.).

Example 13

10 parts of p-phenylenediisocyanate were dissolved in 200 parts of a mixture of equal amount of fuming sulfuric acid and polyphosphoric acid at room temperature under nitrogen atmosphere. Into this solution was added dropwise 13.5 parts of 3,3′-dicarboxybenzidine in the period of 60 min. The polymerization system was heated first at 80° C. for 2 hours and subsequently at 120° C. for 5 hours. The resulting polymer shows excellent thermal stability even around 550–600° C.

$\eta_{inh}$ is 0.80 (conc. $H_2SO_4$, 0.5%, 25° C.).

Example 14

Instead of 3,3′-dicarboxybenzidine in Example 12, 3,3′-dicarboethoxy-benzidine was employed. It afforded an excellent thermally stable polymer with $\eta_{inh}$ of 0.7 (conc. $H_2SO_4$, 0.5%, 25° C.).

Example 15

44.0 parts of 4,4′-diamino-3,3′-dicarboxy diphenylether and 16.9 parts of 3,3′-dimethoxy-4,4′-diphenyldiisocyanate were disolved in 600 parts of polyphosphoric acid under nitrogen atmosphere and the solution was heated at 150° C. for 15 hours. The resulting polymer was thoroughly pulverized and heated at 280–300° C./1 mm. Hg under nitrogen atmosphere for 2 hours. At the end of this thermal treatment, the resulting polyquinazolinedione shows excellent thermal stability even around 500° C.

$\eta_{inh}$ is 0.92 (conc. $H_2SO_4$, 0.5%, 25° C.).

Example 16

Instead of 3,3′-dicarboxybenzidine in Example 6, 2,6-dicarboxy-3,7-diaminonaphthalene was employed. It afforded an excellent thermally stable polymer with $\eta_{inh}$ of 0.86 (conc. $H_2SO_4$, 0.5%, 25° C.).

Example 17

32.7 parts of bis(4,4′-diamino-3,3′-dicarboxy phenyl) sulfone and 30 parts of bis(4,4′-isocyanly phenyl) sulfone were dissolved in 600 parts of polyphosphoric acid under nitrogen atmosphere and the solution was heated at 150° C. for 15 hours. The resulting polymer was pulverized and heated at 300–320° C./1 mm. Hg under nitrogen atmosphere.

The thermal stability of the resultant polymer was measured at 550° C. The weight loss was found to be 5% of the original weight measured at 550° and 10%, at 700° C. $\eta_{inh}$ is 1.40 (conc. $H_2SO_4$, 0.5%, 25° C.).

What we claim is:

1. A process for the preparation of a normally solid polyquinazoline dione which comprises recurring structural units of the class consisting of:

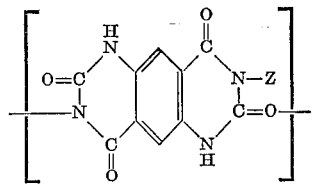

and

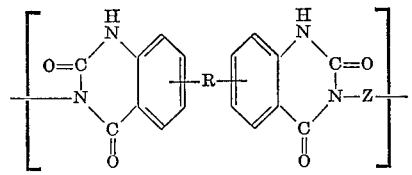

wherein Z is a divalent radical selected from the group consisting of:

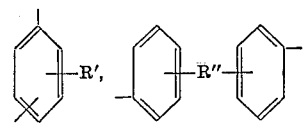

and

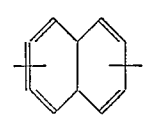

—R— is selected from the group consisting of a direct carbon-to-carbon bond between the two aromatic rings, an alkylene radical having 1 to 3 carbon atoms, oxygen, —CONH—, and

R′ is a monovalent radical selected from the group consisting of hydrogen and an alkyl radical having up to 2 carbon atoms, and R″ is selected from the group consisting of a direct carbon-to-carbon bond between the two aromatic radicals and an alkylene radical having 1 to 3 carbon atoms, which process comprises heating a substantially equimolar mixture of (a) an aromatic compound selected from the group consisting of

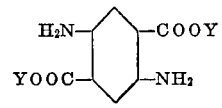

and

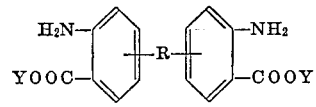

wherein Y is a monovalent radical selected from the group consisting of hydrogen and alkyl, and R is a divalent radical defined above, with (b) an arylene diisocyanate selected from the group consisting of

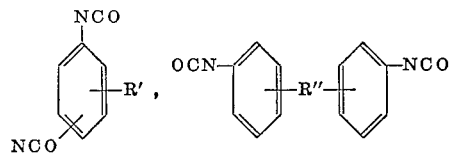

and

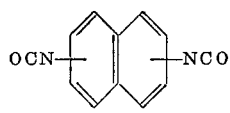

wherein R' and R" have the same meanings as defined above, to a temperature of 100 to 400° C. in the presence of fuming sulphuric acid as an acidic liquid dehydrating agent, the mixture being present in an amount of 5–20% by volume of the liquid dehydrating agent.

2. A process as claimed in claim 1 wherein said mixture is heated to a temperature of 100 to 220° C. in the acidic liquid dehydrating agent for 30 minutes to 15 hours to form a resulting prepolymer which is removed and thereafter heated to a temperature of 220 to 400° C. for 2 to 5 hours.

References Cited

UNITED STATES PATENTS

| | | | |
|---|---|---|---|
| 3,345,334 | 10/1967 | Angelo | 260—47 |
| 2,502,548 | 4/1950 | Allen et al. | 260—77.5 |
| 2,929,800 | 3/1960 | Hill | 260—77.5 |
| 2,343,808 | 3/1944 | Schlack | 260—2 |
| 2,761,852 | 9/1956 | Lehmann et al. | 260—29.2 |

FOREIGN PATENTS

| | | |
|---|---|---|
| 877,602 | 5/1953 | Germany. |
| 1,115,447 | 10/1961 | Germany. |

OTHER REFERENCES

Sorenson; J. Org. Chem., vol. 24, No. 7, pp. 978–980. Copy available in Scientific Library, Call No. QD241.J6.

Chemical Abstracts: vol. 50, No. 9, May 10, 1956, p. 6774. Copy available in Scientific Library, Call No. QD1.A51.

DONALD E. CZAJA, *Primary Examiner.*

M. J. WELSH, *Assistant Examiner.*